US007689472B2

(12) United States Patent    (10) Patent No.:     US 7,689,472 B2
Barsness et al.              (45) Date of Patent:     Mar. 30, 2010

(54) REQUEST TYPE GRID COMPUTING

(75) Inventors: Eric L. Barsness, Pine Island, MN (US); Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 12/023,812

(22) Filed: Jan. 31, 2008

(65) Prior Publication Data

US 2008/0126229 A1    May 29, 2008

Related U.S. Application Data

(62) Division of application No. 10/659,977, filed on Sep. 11, 2003, now Pat. No. 7,467,102.

(51) Int. Cl.
 *G06Q 30/00* (2006.01)
(52) U.S. Cl. ............................................ 705/26; 705/37
(58) Field of Classification Search .................... 705/26, 705/37
See application file for complete search history.

(56) References Cited

U.S. PATENT DOCUMENTS

2004/0162638 A1   8/2004   Solomon

2005/0027863 A1 * 2/2005 Talwar et al. ............... 709/226
2005/0038708 A1   2/2005 Wu

OTHER PUBLICATIONS

Wolski et al., Analyzing market-based resource allocation strategies for the computational grid, Rich Wolski, James S Plank, John Brevik, Todd Bryan. The International Journal of High Performance Computing Applications. London: Fall 2001. vol. 15, Iss. 3; p. 258, downloaded from ProQuest IDrect on the Internet on Mar. 28, 2009, 24 pages.*
Presswire (M2Presswire, Platform Computing releases first grid-enabled workload management solution for IBM eServer Intel and UNIX high performance computing clusters; Out-of-the-box solution maximizes the performance and capability of applications on IBM HPC clusters), Coventry, Sep. 5, 2002, downloaded from ProQuest Direct Internet on Mar. 28, 2009.*
Little and Sager, Who needs super computers, Business Week, New York, Jun. 3, 2002, Iss. 3785, p. 82, downloaded from ProQuest Direct on the Internet on Mar. 28, 2009, 4 pages.*

* cited by examiner

*Primary Examiner*—James Zurita
(74) *Attorney, Agent, or Firm*—Patterson & Sheridan, LLP

(57) ABSTRACT

Methods, articles of manufacture, and systems for providing access to a grid computing environment. In one environment, requests include resource specific criteria used to identify a particular grid resource to perform the request. In another embodiment, a request includes a queue criterion used to identify one of a plurality of queues on which the request is placed.

12 Claims, 5 Drawing Sheets

REQUEST TYPE GRID COMPUTING

CROSS-REFERENCE TO RELATED APPLICATIONS

This is a divisional of U.S. patent application Ser. No. 10/659,977 filed Sep. 11, 2003 now U.S. Pat. No. 7,467,102, which is herein incorporated by reference.

BACKGROUND OF THE INVENTION

1. Field of the Invention

The present invention generally relates to data processing and more particularly to providing computing services through a grid computing environment.

2. Description of the Related Art

The operation of a business is a dynamic undertaking. To increase profit margins, businesses continually seek out means of assessing and controlling costs. For example, one attractive alternative to outright purchases of assets is leasing of the assets. Leasing provides flexibility and, in some cases, tax advantages.

However, regardless of whether an asset is purchased or leased, some assets have periods of idleness, or decreased usage. During these periods, the assets are not productive, or not optimally productive, but still have associated costs which the business incurs. A particular asset that suffers from this problem is the computer.

Today's computers are powerful devices having significant capacity for functions such as processing and storage. Unfortunately, the cost of owning and operating computers can be significant for some businesses. In order to be effective, the computerized resources of a business must be sufficient to meet the current needs of the business, as well as projected needs due to growth. In addition, even assuming no growth, the resources must be capable of tolerating the business's inevitable peaks and valleys of day-to-day operations due to increased loads for seasonal, period end, or special promotions.

As a result, businesses are left in the position of having to invest in more computerized resources than are immediately needed in order to accommodate growth and operational peaks and valleys. In the event the growth exceeds the available computerized resources, the business must upgrade its resources, again allowing for projected growth. Thus, at any given time in its growth cycle, a business will have excess computer capacity allowing for growth as well as the peaks and valleys of short-term operations. This excess capacity translates into real cost for the business.

One conventional solution that gives user's more flexibility is on-demand access to computerized resources. Various forms of on-demand resource access are available from International Business Machines Corporation (IBM). For example, one form of on-demand access is provided by International Business Machines, Inc. under the name "Capacity on Demand" on its line of eServer computers. In any case, computerized resources are made available on-demand in response to actual needs, rather than projected needs. In one aspect, the provision of such flexibility provides a cost efficient solution to accommodate peaks and valleys that occur in any business. Increased loads for seasonal, period end, or special promotions, for example, can be responded to quickly and efficiently. A customer pays for the capacity/resources that it needs, when it is needed. As a result, the cost of computerized resources substantially matches the computerized resources actually being used, and does not include a substantial premium for excess capacity not being used. Of course, in practice, providers may attach some form of a premium to the flexibility provided by on demand resource access. However, even with such a premium, some users will realize savings.

A problem with on-demand resources, however, is that customers may still have to incur costs associated with transportation, maintenance and storage of these additional resources. Additionally, at any given time there may be idle resources available that are not being used. This may amount to a waste of resources for a service provider and/or an unnecessary expense for a customer.

An alternative to on-demand resources is grid computing. A grid computing environment may be a type of parallel and distributed computing system which enables the sharing, selection, and aggregation of geographically distributed resources at runtime depending on their availability, capability, performance, cost, and/or user's quality of service requirements. The advantage of grid computing is that the end users are not burdened with cost of ownership issues such as purchase/lease cost and maintenance costs. However, currently users are limited in the options from which they may select when submitting requests. In particular, users are limited to specifying the minimal requirements for a job to be run properly. Examples of such requirements include the computer architecture (e.g., Intel or PowerPC), and minimal memory and disk resources.

Accordingly, there is a need for exploiting, enhancing and adding flexibilities made available to users of grid computing resources.

SUMMARY OF THE INVENTION

Aspects of the invention generally provide methods, articles of manufacture, and systems for providing user options for processing requests in a grid-based computing environment.

In another embodiment, user requests include machine specific criteria. The machine specific criteria may include any variety of criteria that require the request to be processed on a particular machine satisfying the criteria.

In a particular embodiment, a computer-implemented method of providing access to grid computing resources available to a plurality of users comprises receiving, from a requesting entity, a request to use a specific grid computing resource to perform a defined function; and routing the request to the specific grid computing resource in accordance with the request.

Another embodiment of the method of providing access to grid computing resources available to a plurality of users comprises receiving, from a requesting entity, a request comprising (i) a defined function to be performed and (ii) a resource specific criterion identifying a specific resource to perform the defined function; and based on the resource specific criterion, identifying a grid computing resource as the specific resource to perform the defined function.

Yet another embodiment of the method of providing access to grid computing resources available to a plurality of users comprises receiving, from a requesting entity, a plurality of requests related to a benchmarking operation, wherein at least one of the requests comprises a defined function to be performed and at least each of the remaining requests comprise a different resource specific criterion identifying a different specific resource to perform the defined function; based on each resource specific criterion, identifying a grid computing resource as the specific resource to perform the defined function, wherein a different grid computing resource is identified for each different resource specific criterion; and submitting each request to perform the defined function to an appropriate grid resource according to the respective different resource specific criterions.

Another embodiment provides a computerized environment comprising a request manager configured to (i) receive, from a requesting entity, a request comprising a defined function to be performed and a resource specific criterion identifying a specific resource to perform the defined function; (ii) based on the resource specific criterion, identify a grid computing resource as the specific resource to perform the defined function, the identified grid computing resource being one of a plurality of resources of a computing grid; and (iii) route the request to the identified grid computing resource.

In another embodiment, a grid provider manages a plurality of queues specific to different request criteria. User requests are placed in particular queues according to the request criteria.

In a particular embodiment, a computer-implemented method of providing access to a computing grid available to a plurality of users comprises receiving a plurality of requests each comprising (i) a queue criterion and (ii) a defined function to be performed by at least one computing resource of the computing grid; and placing each request on a different one of a plurality of queues according to the respective queue criterion.

In yet another embodiment, a computerized environment comprises a plurality of queues each configured for different request types; and a request manager. The request manager is configured to receive a plurality of requests each comprising (i) a queue criterion and (ii) a defined function to be performed by at least one computing resource of a computing grid; and place each request on a different one of the plurality of queues according to the respective queue criterion.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention is generally directed to a system, method, and article of manufacture for providing user options for processing requests in a grid-based computing environment. For example, a wide variety of computing resources and services (grid computing environment) may be made available to customers via a service provider. In some embodiments, the customers may be charged a fee for use of the grid computing environment.

It should be noted that while aspects of the invention are described in the context of a business, the invention provides advantages to any user, whether involved in a business or not.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Machine Specific Requests in Grid Computing Environment

In one embodiment, user requests include machine/resource specific criteria. The machine specific criteria may include any variety of criteria that require the request to be processed on a particular machine satisfying the criteria.

Figure 1:
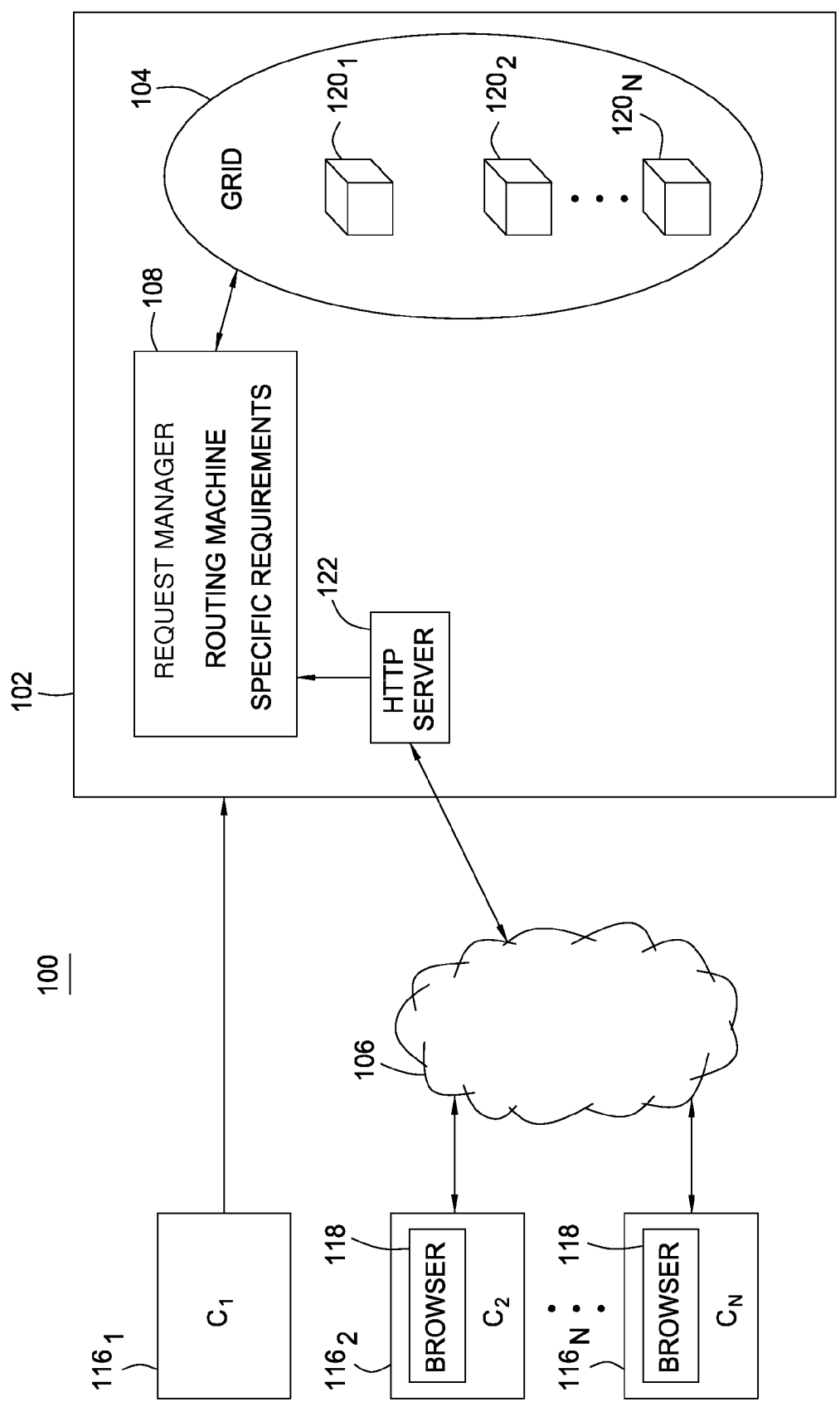
FIG. 1 is a block diagram of an environment having a provider of computing services through a grid environment in which requests include machine specific parameters, in accordance with one embodiment of the present invention.

Referring now to FIG. 1, a data processing environment 100 is shown. Generally, the environment includes a provider computer 102 and a plurality of one or more customer computers $116_1$-$116_N$. The provider computer 102 is illustratively embodied as a server computer with respect to the customer computers 116, which are, therefore, embodied as client computers. Although all computers are shown as singular entities, in practice the provider computer 102 and the client computers 116 may all be a network of computers configured to perform various functions, including those described herein. Further, the terms "client" and "server" are used merely for convenience and not by way of limitation. As such, the customer computers 116, which may be clients relative to the provider computer 102 in some regards, may themselves be servers relative to one or more other clients (not shown).

The provider computer 102 and the customer computers 116 communicate through a network 106. Illustratively, the network 106 may be any medium through which information may be transferred such as, for example, a local area network (LAN) and a wide area network (WAN), or a telephone network. The network 106 is merely representative of one communications medium. Some aspects of the invention may be facilitated by other communication mediums such as, for example, the U.S. Postal Service. For example, the customer computer $116_1$ may use other forms of communication such as snail mail, facsimile, or a telephone instead of the network 106 to communicate with the provider computer 102. Other aspects may also be practiced in the absence of any communication mediums between the provider 102 and the customers 116.

In a particular embodiment, the network 106 is the Internet. As such, the provider computer 102 may be configured with a hypertext transfer protocol (HTTP) server 122 capable of servicing requests from browser programs 118 residing on the customer computers 116. The HTTP server 122 and the browser program 118 provide convenient and well-known software components for establishing a network connection (e.g., a TCP/IP connection) via the network 106, and for receiving information from users on the computer systems 116.

Generally, the provider computer 102 provides the customer computers 116 with access to a grid 104. The grid 104 is a grid computing environment containing a number of different computing resources $120_1$-$120_N$. In one embodiment, a grid computing environment may be a type of parallel and distributed computing system which enables the sharing, selection, and aggregation of geographically distributed resources at runtime depending on their availability, capability, performance, cost, and/or user's quality of service requirements. The grid 104 may be a network of many diverse hardware and/or software computing resources including, but not limited to, applications, databases, web services, storage, computing power, and the like. These resources may be available and accessible through a network medium such as, the Internet, to a wide variety of users and may be shared between them. Access to different resources within the grid 104 may also be provided by different service providers.

In one embodiment, the provider computer 102 is configured with a manager 108 to manage requests for grid resources from the clients 116, which hereinafter may be referred to as request manager. Although, the manager 108 is shown as a single entity, it should be noted that it may be representative of different functions implemented by different software and/or hardware components within the provider computer 102. In general, the manager 108 manages the requests from the client computers 116. The requests may include various request criteria (i.e., parameters included with the request). Accordingly, the manager 108 may be configured to determine whether at least some of the response criteria can be satisfied. If the manager determines the request can be satisfied, the manager routes the request to the appropriate resources of the grid 104.

In one embodiment, request criteria include at least machine specific parameters. A machine specific parameter is any specific parameter of a machine, i.e., a parameter that is specifically identified with a machine. Machine specific parameters include any variety of known and unknown parameters including, but not limited to, those provided in TABLE I.

TABLE I

SYSTEM SPECIFIC PARAMETER EXAMPLES:

Number of CPUs
Speed of CPUs
Type of CPUs (Intel Pentium ®, AMD Athlon ®, IBM Power4 ®, etc.)
Size of L1, L2, L3 caches
OS type (windows, OS/400, AIX, etc.)
OS version (V5R2, 3.0, etc.)
Dedicated in shared system
Security level
Number of disk arms
Amount of main memory
Database Management System (DBMS) type (SAS SQL Server, IBM DB2, etc.)
DBMS version
System measurement values that could be returned
CPU utilization
Memory paging rates
Disk arm utilization Note that each parameter is specific, in the sense that a given machine either satisfies the parameter or does not satisfy the parameter. However, more than one machine may satisfy a given parameter. Thus, the greater the number of parameters specified in a given request, the lesser the number of machines which will satisfy the request. In this regard, it is contemplated that a request may uniquely identify a machine or group of machines by including unique machine identifiers (e.g., machine type and serial number).

Allowing a user to specify a particular machine or machines in a grid provides a number of advantages to the user. For example, a user may utilize this functionality to perform benchmarking. Benchmarking refers to the systematic testing of machines to determine, for example, performance needs of a user. As an example, TABLE II shows a test list in which the user has specified a plurality of test requests to be run on selected machines of the grid. Specifically, each row is a separate test and the machines are selected according to machine specific parameters.

TABLE II

Example benchmark test case file:

| OS TYPE | OS LEVEL | # CPUs | CPU TYPE |
|---------|----------|--------|----------|
| OS/400  | V5R1     | 4      | Power 4  |
| OS/400  | V5R2     | 4      | Power 4  |

In addition to machine specific parameters, the request criteria may include any variety of other criterions. For example, in one embodiment, the request criteria additionally include the time to process a request and/or return a response. That is the user may specify, for example, how quickly results must be returned to the user.

In one embodiment, at least some of the requests are fulfilled on a fee basis, which may be calculated by the manager 108. The fee charged may be dependant on the various criteria (referred to here as fee criteria), such as the machine specific criteria, the time to process a request and/or return a response and other request criteria defined above. In one embodiment, the manager 108 implements tiered response time pricing as described in U.S. application Ser. No. 10/659,976 filed on Sep. 12, 2003, published on Mar. 17, 2003 as PG-PUB US20050060163, entitled "Power on Demand Tiered Response Time Pricing" and herein incorporated by reference in its entirety. Accordingly, the manager 108 may also monitor progress of the requests by keeping track of time spent on a particular request.

Figure 2:
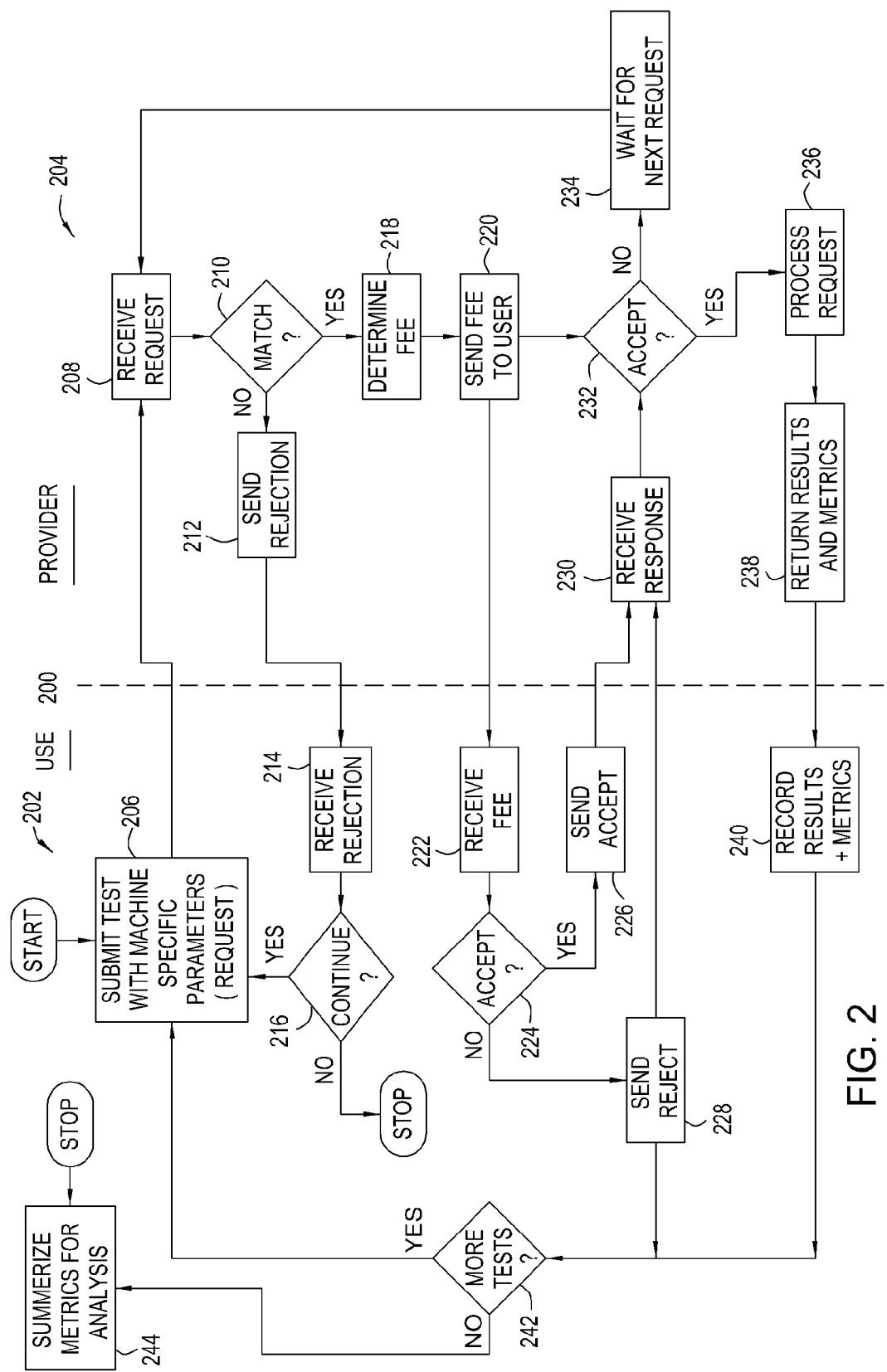
FIG. 2 is a flowchart illustrating the submission and processing of requests having machine specific parameters, in accordance with one embodiment of the present invention.

FIG. 2 illustrates an exemplary method 200 for submitting and processing machine specific requests to a grid computing environment (e.g., the grid 104 FIG. 1). The left-hand side of FIG. 2 represents processing 202 performed by a user (e.g., a user of one of the customer computers of FIG. 1) and the right-hand side represents processing 204 performed by the provider of FIG. 1. In one embodiment, the provider processing 204 is implemented by the manager 108 (FIG. 1). Illustratively, the method 200 describes a user performing benchmarking. Accordingly, a plurality of test requests related to a given benchmarking operation is submitted (e.g., via the network 106). However, more generally singular requests may be submitted by the user and processed by the provider in the same or similar way, in which case some of the benchmarking-specific operations of method 200 may not be necessary, as will be apparent to a person skilled in the art. Further, whether or not performing benchmarking, some of the operations of method 200 may be omitted, supplemented with additional operations, be performed in parallel or be performed in a different order.

In the illustrative embodiment, individual test requests for a benchmarking operation are submitted in series, wherein each consecutive request is submitted by the user upon completion of the previous request. Alternatively, the complete set of test requests for a given benchmarking operation may be submitted as a batch to the provider, which then returns results incrementally for each request or as a batch. For a given request submitted by a user to the provider (step 206), the provider receives the request (step 208) and then determines whether the request can be fulfilled (step 210). That is, the provider determines whether the grid includes a machine (or machines) satisfying the request criteria. In one embodiment, an exact match is required, while in another embodiment a degree of variance may be tolerated (e.g., by using a best-fit algorithm). If the grid does not include a machine which matches the request criteria, the request cannot be processed, and a rejection is sent to the customer (step 212). Upon receiving the rejection (step 214) the user may be prompted to indicate whether to continue processing additional test requests for a particular benchmarking operation (step 216). If the user elects not to continue, no further test requests are submitted for that benchmarking operation. If the user elects to continue, the next test request is submitted (step 206).

Returning to step 210, if the machine specific request criteria is matched to a particular grid machine, the provider may then determine a fee to process the request (step 218). In one embodiment, the fee to be charged to the user is dependent upon the particular machine selected to perform the request. For example, a highly specialized machine may be more expensive than a general-purpose machine. Likewise, a machine having limited availability (e.g., due to excessive demand from other users) may cost a premium. In one embodiment, the user is permitted to request a dedicated machine to perform the user's request(s). That is, the machine will be made available exclusively to a particular user, and to the exclusion of all other users. It is contemplated that such requests for dedicated machines will also cost a premium relative to requests run on non-dedicated machines. In some cases, the fee to be charged to the user is dependent upon aspects of processing the request which cannot be predetermined (e.g., the amount of time needed to process the request). Accordingly, the fee determined prior to processing the request may be an estimate. Alternatively, the fee may be determined after the request has been processed.

Once determined, the fee is sent to the user (step 220). Upon receipt (step 222), the user may accept or decline the fee (step 224), in which case an acceptance (step 226) or a rejection (step 228), respectively, is sent back to the provider. The provider receives the user's response (step 230) and determines whether the response is an acceptance or a rejection (step 232). If the response is a rejection, the provider waits for the next request (step 234); and if the response is an acceptance, the provider processes the request (step 236).

Depending upon the nature of the test request, the provider may then returns results to the user (step 238). For example, the test request may have been a query to be run against a selected database or databases. For a benchmarking operation, the provider may also return various metrics (step 238), such as CPU utilization, memory paging rates, disk utilization, etc. The user may then record the results and/or metrics (step 240). If the benchmarking operation includes more test requests (step 242), the next request is submitted to the provider (step 206). The processing described above is then repeated until all of the test requests have been processed. At that point the metrics may be summarized for analysis by the user (step 244).

Grid Processing Using Request Queues

In another embodiment, the provider 102 manages a plurality of queues specific to different request criteria. User requests are placed in particular queues according to the request criteria.

Figure 3:
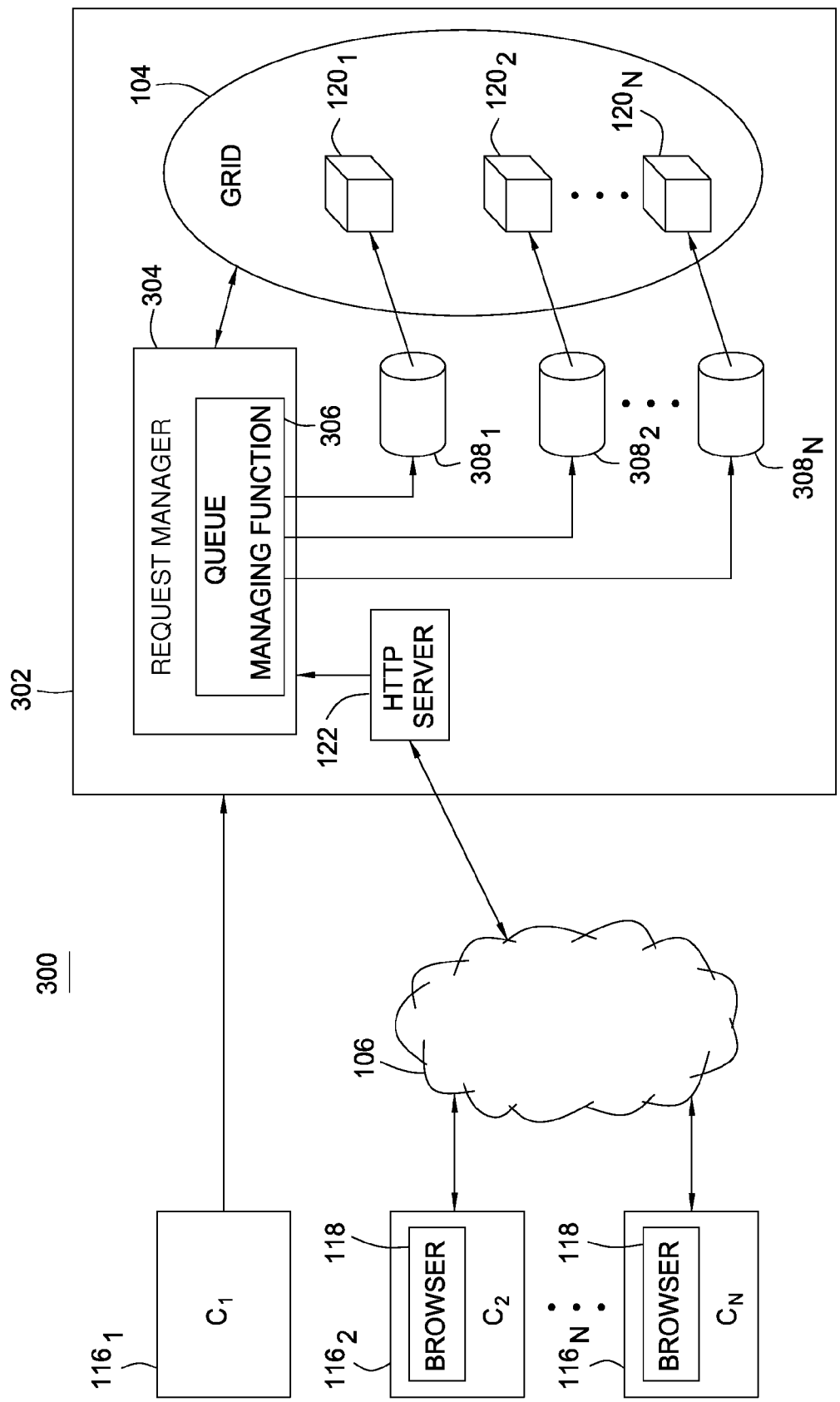
FIG. 3 is a block diagram of an environment having a provider of computing services through a grid environment in which requests are placed on queues according to the request type, in accordance with one embodiment of the present invention.

FIG. 3 shows a computing environment 300 which includes a provider 302 configured for grid processing using request queues. For convenience and brevity, like components described above with respect to FIG. 1 are included in FIG. 3 and identified by their reference numerals. In addition to these components, the grid provider 302 includes a manager 304, which may also be referred to herein as request manager, configured with a queue managing function 306. The queue managing function 306 determines which of a plurality of queues $308_1$, $308_2$, . . . $308_N$ each request (received, e.g., from the network 106) is placed on. In a particular embodiment, the queues 308 are First-In-First-Out (FIFO). That is, requests are time ordered and processed in the order in which they are received. However, any other type of queue architecture is contemplated.

Each queue may be configured with different attributes affecting, for example, the manner in which a request is processed and/or a fee to be charged for processing the request. Examples of different queues (i.e., queues having different attributes) are described below with respect to FIG. 5.

Although lines are drawn between individual queues 308 and individual resources 120 of the grid 104, this illustration is not intended to suggest a fixed relationship between queues and resources. Accordingly, a first request in the first queue $308_1$ may be handled by a first grid resource $120_1$ and a second request in the first queue $308_1$ may be handled by a second grid resource $120_2$. However, in an alternative embodiment, some or all of the queues 308 have fixed relationships with respective grid resources 120. In such an embodiment, requests placed on these queues will always be processed by the same grid resource.

In one embodiment, the manager 304 (as implemented by the queue managing function 306) is responsible for monitoring the grid and routing work from the queues 308 to resources within the grid. The manager 304 may take into account the queue requirements while moving work requests on the queues and routing them to grid resources. For example, the manager 304 may choose to route a request from a "high priority" queue to a grid resource that has a specific machine resource queue associated with, potentially ahead of requests on the other queue, in order to complete the higher priority work first.

Figure 4:
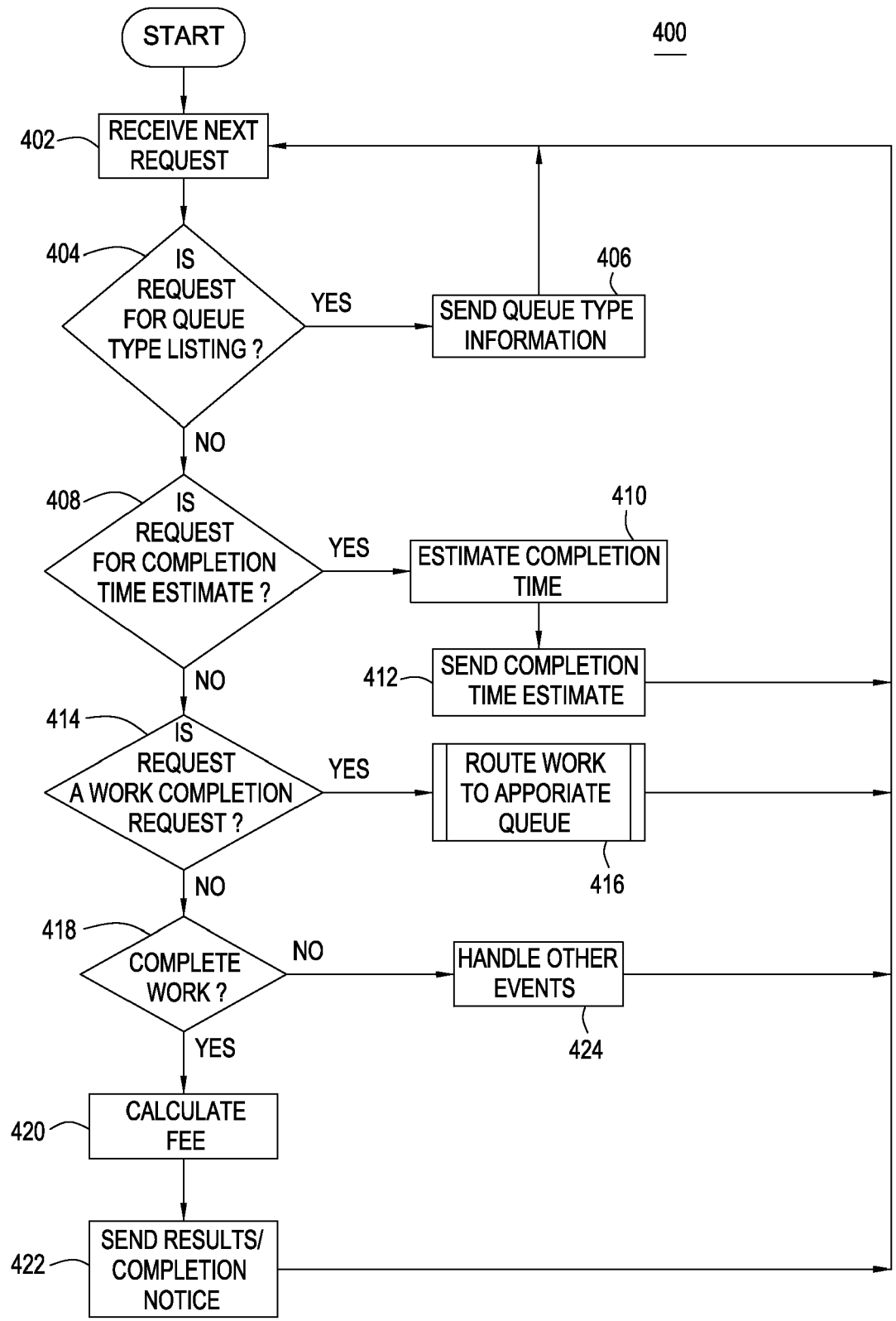
FIG. 4 is a flowchart illustrating the handling of different requests, including work requests to be performed in a grid environment, in accordance with one embodiment of the present invention.

It is noted that the manager 304 may perform a variety of functions in addition to the queue managing function 306. For example, FIG. 4 shows one embodiment of a method 400 describing operations performed by the manager 304. Illustratively, the method 400 describes an event driven model in that the manager 304 performs actions in response to receiving a user request or other event (step 402).

Illustrative user request types supported by the manager 304 include requests for a queue type listing, completion time estimate and a grid work request. In each case, the manager 304 takes some action responsive to the request and then returns to a wait state until receipt of the next request (step 402).

If the request is for a queue type listing (step 404) the manager 304 sends the queue type information to the user (step 406) and then waits for the next request (step 402). The queue type information may include a list of all available queues types on which requests may be placed, as well as any fees associated with the respective queues. Illustrative queue types are described below with respect FIG. 5.

A request for a completion time estimate (determined at step 408) would typically include a grid work request to be performed in the grid 104 and a parameter prompting the manager 304 to calculate the estimated time needed to complete the grid work request. In an alternative embodiment, the user may have already submitted the grid work request and the request for a completion time estimate is an inquiry as to the remaining time before completion. In either case, the manager 304 estimates a completion time (step 410) and sends the estimate to the user (step 412). It is contemplated that the completion time estimate includes the sum of a processing time estimate and a wait time estimate (i.e., a period of time before processing can start). Of course, if processing has already begun, the completion time estimate reflects only an estimate of the time remaining. In the latter situation the manager 304 may also return the elapsed time (i.e., the amount of time elapsed since the grid work request was received from the user and/or the amount of time elapsed since processing of the request was initiated).

At some point, a user will submit a grid work request (step 414), i.e., a request to be processed using the resources 120 of the grid 104. Such requests include the necessary parameters to identify an appropriate queue on which to place the request. In this regard it is contemplated that a request may explicitly identify a queue, or include sufficient information allowing the queue managing function 306 to identify the appropriate queue. In either case, the queue managing function 306 may be invoked to route the work request to the appropriate queue (step 416). It is contemplated that the manager 304 is signaled when a work request has been completed (step 418). In one embodiment, the manager 304 then calculates a fee to be charged to the user for performing to work request (step 420). In an alternative embodiment the fee may have been calculated (or estimated) and provided to the user prior to performing to work request. The manager 304 then sends the user the results of the work request (if any), a completion notice, and/or the fee (step 422). Step 424 is representative of other events that may be handled by the manager 304.

Figure 5:
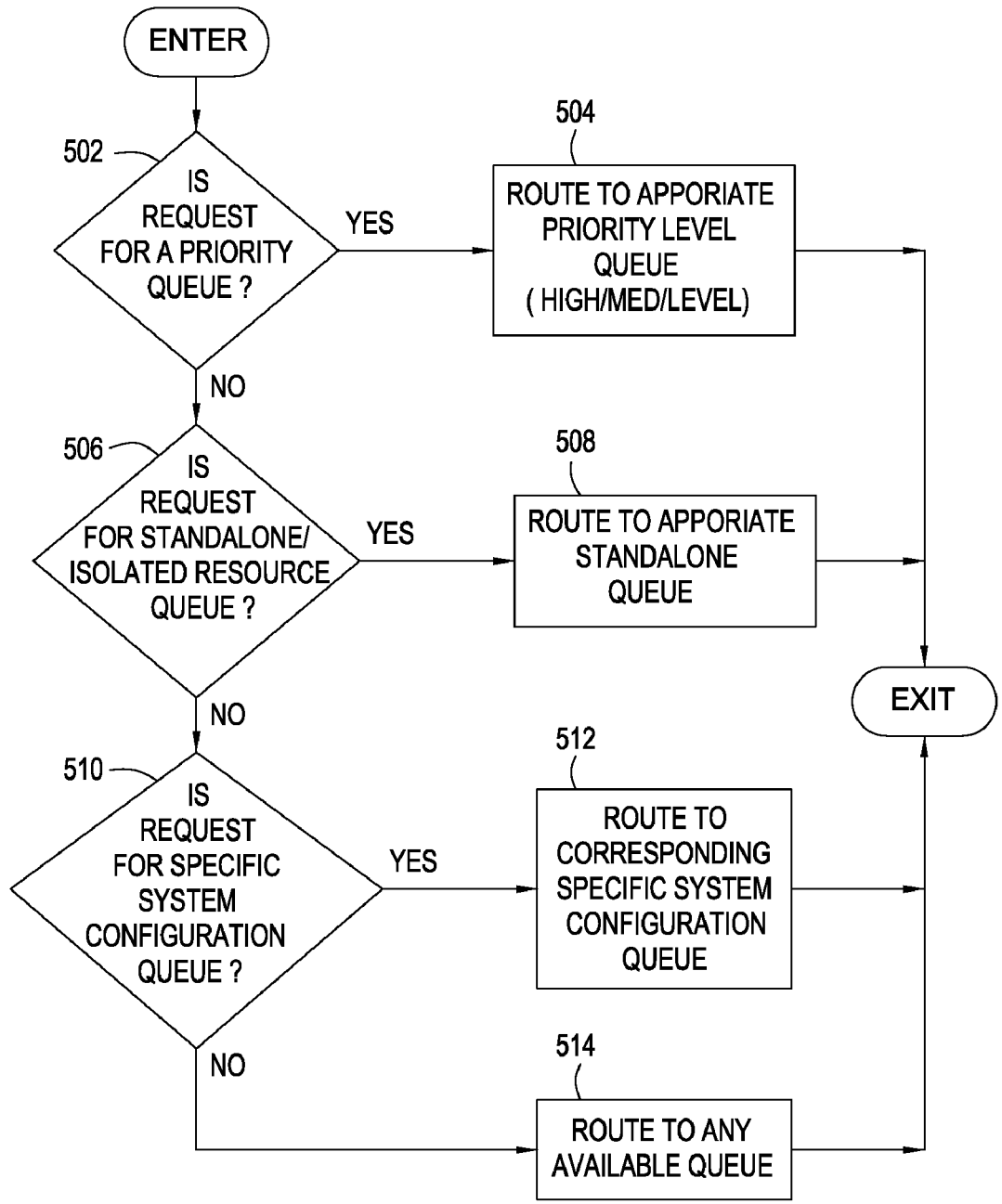
FIG. 5 is a flowchart illustrating the routing of different request types to different queues.

Referring now to FIG. 5 one embodiment of operations implemented by the queue managing function 306 at step 416 (of FIG. 4) are shown. In general, the queue managing function 306 routes each incoming grid work request to an appropriate queue. For example, in one embodiment a request may specify a particular priority level (step 502) that causes the queue managing function 306 to route to request to the corresponding priority queue (step 504). Priority levels may include, for example, high, medium and low, and a separate queue is configured for each different priority level. In another embodiment, requests (identified at step 506) may specify a queue(s) configured for stand-alone/isolated resources. That is, the user may desire to process a request on a dedicated resource that is not shared with other users (at least while the request is being processed). Accordingly, the queue managing function 306 routes the request to the appropriate stand-alone queue (step 508). In yet another embodiment, queues are machine specific (i.e., associated with different machines). Such an implementation facilitates servicing machine specific requests as described above, except that, at least in one embodiment, the user need not explicitly submit machine attributes as parameters of the request, since machine selection is achieved by selection of a particular machine specific queue from a plurality of machine specific queues. In another embodiment, however, the machine specific queue(s) is not associated with any particular machine, but merely provides a "port" through which all machine specific requests (including explicit machine attributes) are routed. In the latter embodiment, the machine specific queue(s) exclusively supports machine specific requests, but the particular machine designated to process the request is identified by parameters of the request, not by the queue(s). In any case, the queue managing function 306 identifies machine specific requests (step 510) and routes each such request to its corresponding queue (step 512). Requests not specific to any particular queue may be placed on a general queue, or on any available queue (step 514). It is noted that the queue types described in FIG. 5 are merely illustrative, and not exhaustive. Persons skilled in the art will recognize other queue types within the scope of the present invention.

While the foregoing is directed to embodiments of the present invention, other and further embodiments of the invention may be devised without departing from the basic scope thereof, and the scope thereof is determined by the claims that follow.

What is claimed is:

1. A computerized environment, comprising:
   one or more computer processors;
   a plurality of queues each having a predefined relationship with one or more queue criterions selected from a plurality of different queue criterions; and
   a request manager which, when executed by the one or more computer processors, is configured to:
      receive, from one or more requesting entities, a plurality of requests each comprising (i) a queue criterion selected from the plurality of different queue criterions and (ii) a function to be performed by at least one computing resource of a computing grid;
      based on the respective queue criterion of each request, identify a specific queue from the plurality of queues to place each of the plurality of requests on; and place each request on the specific queue identified for the request.

2. The computerized environment of claim 1, wherein the request manager is further configured to determine a price to be charged for fulfilling each request.

3. The computerized environment of claim 1, wherein each queue of the plurality of queues is associated with a different pricing level and wherein the request manager is further configured to determine a price to be charged for fulfilling each request based on its respective queue.

4. The computerized environment of claim 1, further comprising the computing grid which is accessible to a plurality of users via the request manager.

5. A computer-implemented method, comprising:
providing a plurality of queues each having a predefined relationship with one or more queue criterions selected from a plurality of different queue criterion;
receiving, by a request manager, a plurality of requests from one or more requesting entities, with each request comprising (i) a queue criterion selected from the plurality of different queue criterions and (ii) a function to be performed by at least one computing resource of a computing grid;
based on the respective queue criterion of each request, identifying a specific queue from the plurality of queues to place each of the plurality of requests on; and
placing, by the request manager, each request on the specific queue identified for the request; wherein the request manager is executing one or more computer processors.

6. The method of claim 5, further comprising determining, by the request manager, a price to be charged for fulfilling each request.

7. The method of claim 5, wherein each queue of the plurality of queues is associated with a different pricing level and further comprising determining, by the request manager, a price to be charged for fulfilling each request based on its respective queue.

8. The method of claim 5, wherein the computing grid is accessible to a plurality of users via the request manager.

9. A computer-readable storage medium containing a program which, when executed by a processor performs an operation, comprising:
providing a plurality of queues each having a predefined relationship with one or more queue criterions selected from a plurality of different queue criterions;
receiving, by a request manager, a plurality of requests from one or more requesting entities, with each request comprising (i) a queue criterion and (ii) a defined function to be performed by at least one computing resource of a computing grid;
based on the respective queue criterion of each request, identifying a specific queue from the plurality of queues to place each of the plurality of requests on; and
placing, by the request manager, each request on the specific queue identified for the request.

10. The computer-readable storage medium of claim 9, further comprising determining, by the request manager, a price to be charged for fulfilling each request.

11. The computer-readable storage medium of claim 9, wherein each queue of the plurality of queues is associated with a different pricing level and further comprising determining, by the request manager, a price to be charged for fulfilling each request based on its respective queue.

12. The computer-readable storage medium of claim 9, wherein the computing grid is accessible to a plurality of users via the request manager.

* * * * *